(12) United States Patent
Su (10) Patent No.: US 11,688,197 B1
(45) Date of Patent: Jun. 27, 2023

(54) FINGERPRINT RECOGNITION MODULE

(71) Applicant: Yu-Sung Su, New Taipei (TW)

(72) Inventor: Yu-Sung Su, New Taipei (TW)

(73) Assignee: IDSPIRE CORPORATION LTD., New Taipei (TW)

( * ) Notice: Subject to any disclaimer, the term of this patent is extended or adjusted under 35 U.S.C. 154(b) by 0 days.

(21) Appl. No.: 17/883,604

(22) Filed: Aug. 9, 2022

(51) Int. Cl.
*G06V 40/13* (2022.01)
*G06F 3/041* (2006.01)

(52) U.S. Cl.
CPC ........ *G06V 40/1306* (2022.01); *G06F 3/0412* (2013.01); *G06F 3/04164* (2019.05)

(58) Field of Classification Search
CPC .. G06V 40/13; G06V 40/1306; G06F 1/1652; G06F 1/1656; G06F 3/0412; G06F 3/04164; G06F 3/0445; G06F 2203/04102; G06F 2203/04103; H01L 23/4985; H01L 21/486; H01L 23/49827; H01L 23/49894
See application file for complete search history.

(56) References Cited

U.S. PATENT DOCUMENTS

| | | | | |
|---|---|---|---|---|
| 8,717,775 | B1* | 5/2014 | Bolognia | H01L 24/06 361/803 |
| 2012/0086117 | A1* | 4/2012 | Chang | H01L 24/82 257/E23.101 |
| 2022/0269918 | A1* | 8/2022 | Su | G06V 40/1329 |

* cited by examiner

*Primary Examiner* — Abhishek Sarma (57) ABSTRACT

The invention provides a fingerprint recognition module comprising a first dielectric layer, a processing unit, a plurality of first sensing series and a plurality of second sensing series. A first side and a second side of the first dielectric layer are provided with first metal contacts and second metal contacts respectively. The processing unit, disposed on the first side, has first conductive pads for electrically connecting the first metal contacts, coupled with the second metal contacts. The first sensing series, coupled with the first traces, are arranged between the first dielectric layer and a second dielectric layer. The second sensing series, coupled with the second traces, are arranged between the second dielectric layer and a third dielectric layer. The first trace is coupled with a third trace through a first conductive pillar, and the second traces and the third traces are coupled with the second metal contacts.

15 Claims, 4 Drawing Sheets

FINGERPRINT RECOGNITION MODULE

BACKGROUND OF THE INVENTION

1. Field of the Invention

The present invention pertains to a fingerprint recognition module, more specifically to a fingerprint recognition module integrating chips and sensing film layers.

2. Description of the Prior Art

Traditional, when a fingerprint recognition module is fabricated, sensing film layers that may detect fingerprints are usually fabricated on a glass substrate or a semiconductor substrate. Next, the glass substrate or the semiconductor substrate with the sensing film layers are cut out by a machine, and connecting cables. After connecting the cables, the cables connect a circuit board on which chips or processing unit mounted. As mentioned above, a traditional fingerprint recognition module requires many and more complex semiconductor technologies, and subsequently assembling the sensing film layers and the circuit board not only increases the manufacturing cost, but also reduces the product yield. In addition, the overall assembly of the traditional fingerprint module is limited by the volumes of the substrate, the cables and the circuit board, and it is not easy to apply to small or thin electronic devices. Accordingly, a new fingerprint recognition module is needed which may not only lower the manufacturing cost of the fingerprint recognition module, but also reduce the volume of the fingerprint recognition module to apply to the small or thin electronic devices.

SUMMARY OF THE INVENTION

The present invention provides a fingerprint recognition module, the fingerprint recognition module may assemble directly sensing film layers and a processing unit, so that the processing unit and a fingerprint recognition region may located on two sides of the fingerprint recognition module respectively. Thus, the fingerprint recognition module of the present invention may be further reduced in dimension, and have a higher assembly yield.

The present invention discloses a fingerprint recognition module, the fingerprint recognition module comprise a first dielectric layer, a processing unit, a plurality of first sensing strings and a plurality of second sensing strings. The first dielectric layer is defined a first side and a second side, an adaptor board is disposed on the first side, two sides of the adaptor board are provided with first metal contact points and second metal contact points electrically connected to the first metal contact points. The processing unit is disposed on the first side, has first conducting pads, and each of the first conducting pads is for electrically connecting to one of the first metal contact points. The first sensing strings are disposed between the first dielectric layer and the second dielectric layer, and electrically connected to the first conducting wires. The second sensing strings are disposed between the second dielectric layer and the third dielectric layer, and electrically connected to the second conducting wires. Wherein each of the first conducting wires are electrically connected to third conducting wires through a first conducting pillar, and the second conducting wires and the third conducting wires are electrically connected to the second metal contact points.

In some embodiments, the first strings are arranged along a first direction, the second strings are arranged along a second direction, and the first direction is perpendicular to the second direction. In addition, the third dielectric layer has a first side and a second side, the second conducting wires, the third conducting wires and the second conducting pads are disposed on the second side of the third dielectric layer, each of the second conducting wires is electrically connected to one of the second conducting pads, and each of the third conducting wires is electrically connected to one of the second conducting pads. Moreover, each of the second metal contact points contacts one of the second conducting pads, the second metal contact points are disposed on an edge of the second side, and a first area may be smaller than a second area.

In some embodiments, the first side of the third dielectric layer is defined a fingerprint recognition region, the fingerprint recognition region overlaps a region surrounded by the first sensing strings and the second sensing strings, and an area of the fingerprint recognition region is smaller than the second area. In addition, the fingerprint recognition module further comprises a metal shell or a metal conducting film layer, wherein the metal shell or the metal conducting film layer is disposed on the first side of the third dielectric layer, and the metal shell or the metal conducting film layer surrounds the fingerprint recognition region. The second conducting wires and the third conducting wires are coplanar.

In some embodiments, the fingerprint recognition module comprises an antistatic via communicating the metal shell or the metal conducting film layer, the first dielectric layer, the second dielectric layer and the third dielectric layer, wherein one end of the antistatic via exposes to the metal shell or the metal conducting film layer, and another end of the antistatic via exposes to the third dielectric layer. In addition, the fingerprint recognition module further comprises a via protecting component, wherein the via protecting component covers the antistatic via exposed to the metal shell or the metal conducting film layer. Moreover, the fingerprint recognition module further comprises a first glue layer, wherein the first glue layer is disposed between the first dielectric layer and the second dielectric layer, and covers the first sensing strings.

The present invention further provides a fingerprint recognition module, the fingerprint recognition module comprises an adaptor board, and assembles sensing film layers and a processing unit on the adaptor board. Thus, the fingerprint recognition module of the present invention may be further reduced in dimension, and have a higher assembly yield.

The present invention provides a fingerprint recognition module, the fingerprint recognition module comprises a first dielectric layer, a plurality of first sensing strings, a plurality of second sensing strings and an adaptor board. The first dielectric layer is provided with first conducting pillars. The first sensing strings are disposed between the first dielectric layer and a second dielectric layer, and electrically connected to first conducting wires, wherein each of the first conducting wires is electrically connected to one of the first conducting pillars. The second sensing strings are disposed between second dielectric layer and third dielectric layer, and electrically connected to second conducting wires. The adaptor board is connected to the first dielectric layer, and provided with first adaptor contact points and second adaptor contact points, wherein the first adaptor contact points are electrically connected to the second adaptor contact points, and each of the first adaptor contact points is for electrically connecting one of the first conducting pillars. Wherein each of the second conducting wires is electrically connected to one of third conducting wires through a second conducting pillar, and each of the third conducting wires is electrically connected to one of the first conducting pillars.

In some embodiments, the first adaptor contact points and the second adaptor contact points may be on two sides of the adaptor board. A projected area surrounded by the first adaptor contact points overlaps a projected area surrounded by the second adaptor contact points. In addition, the first adaptor contact points and the second adaptor contact points are also on the side of the adaptor board. The fingerprint recognition module further comprises a processing unit, wherein the processing unit has first conducting pads, and each of the first conducting pads is for electrically connecting to one of the first adaptor contact points. Moreover, the first conducting pillars expose the first dielectric layer next to the adaptor board to form first metal contact points on a surface of the first dielectric layer.

In summary, the fingerprint recognition module provided by the present invention may directly assemble the sensing film layer and the processing unit, so that the processing unit and the fingerprint recognition region may be located on two sides of the fingerprint recognition module respectively. Thus, the fingerprint recognition module of the present invention may be further reduced in dimension, and have the higher assembly yield. In addition, another fingerprint recognition module provided by the present invention may have the extended adaptor board, and the processing unit may be assembled on the same side or two sides of the adaptor board, which may also reduce the dimension of the fingerprint recognition module and may have higher assembly yield.

DETAILED DESCRIPTION OF THE INVENTION

The features, objectives, and functions of the present invention are further disclosed below. However, it is only a few of the possible embodiments of the present invention, and the scope of the present invention is not limited thereto; that is, the equivalent changes and modifications done in accordance with the claims of the present invention will remain the subject of the present invention. Without departing from the spirit and scope of the invention, it should be considered as further enablement of the invention.

Figure 1:
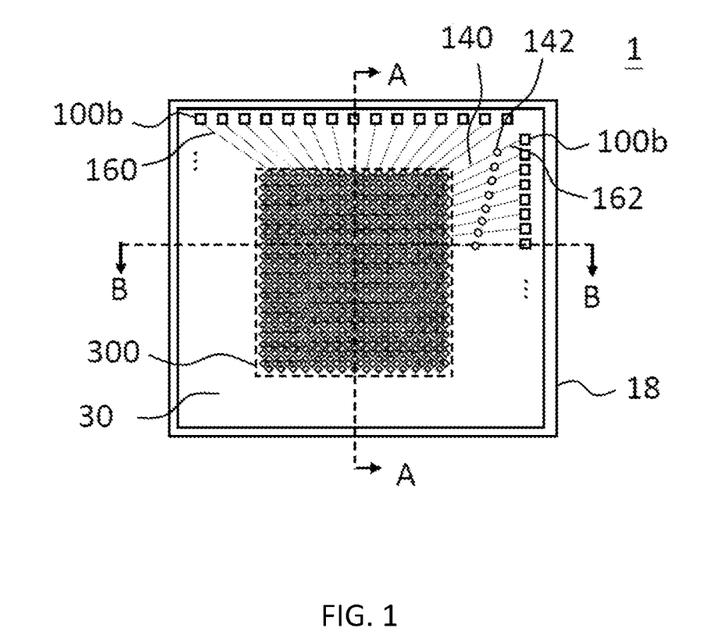
FIG. 1 is a schematic top view of the fingerprint recognition module in accordance with an embodiment of the present invention.
Figure 2:
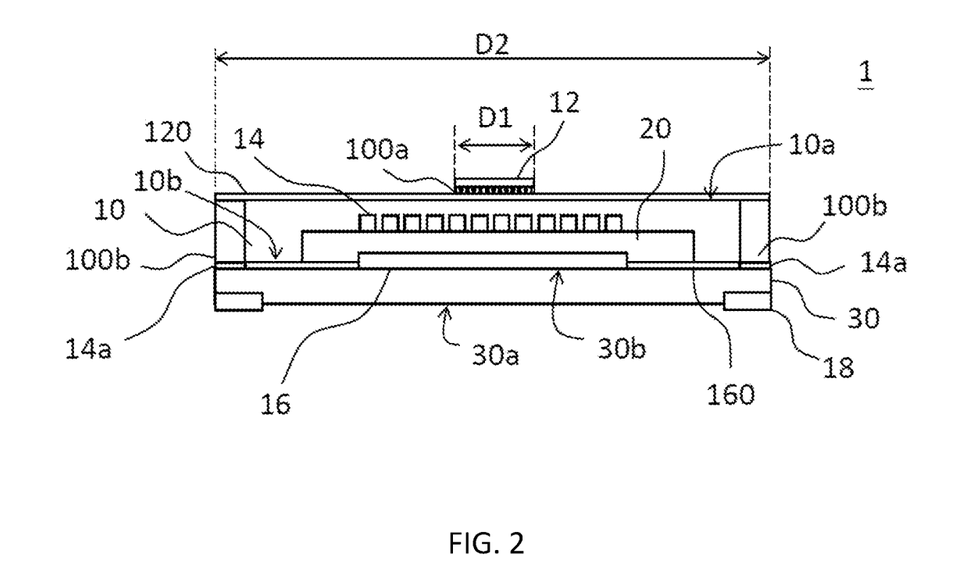
FIG. 2 is a schematic cross-sectional view of the fingerprint recognition module along the first direction in accordance with an embodiment of the present invention.
Figure 3:
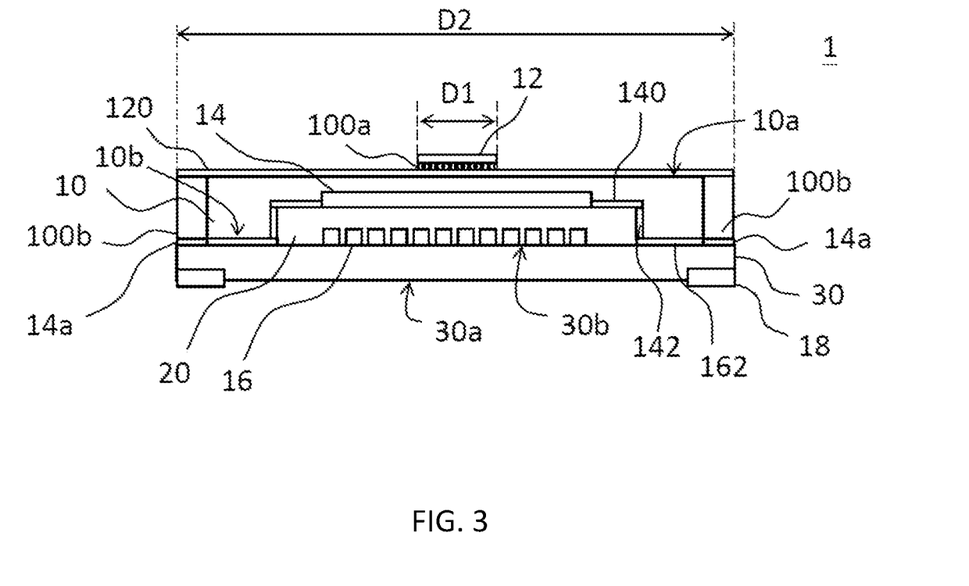
FIG. 3 is a schematic cross-sectional view of the fingerprint recognition module along the second direction in accordance with an embodiment of the present invention.

Please refer to FIG. 1 to FIG. 3. FIG. 1 is a schematic top view of the fingerprint recognition module in accordance with an embodiment of the present invention. FIG. 2 is a schematic cross-sectional view of the fingerprint recognition module along the first direction in accordance with an embodiment of the present invention. FIG. 3 is a schematic cross-sectional view of the fingerprint recognition module along the second direction in accordance with an embodiment of the present invention. As shown in the figures, a fingerprint recognition module 1 comprises a first dielectric layer 10, a processing unit 12, a plurality of first sensing strings 14 and a plurality of second sensing strings 16. The first sensing strings 14 are disposed between the first dielectric layer 10 and a second dielectric layer 20, and the second sensing strings 16 are disposed between the second dielectric layer 20 and a third dielectric layer 30. As shown in FIG. 2 and FIG. 3, the first dielectric layer 10, the second dielectric layer 20 and the third dielectric layer 30 form a stacked structure, and the dimensions of the first dielectric layer 10, the second dielectric layer 20 and the third dielectric layer 30 may be different. For example, an area of the second dielectric layer 20 may be smaller than the others, and the second dielectric layer 20 may be encased in the center by the first dielectric layer 10 and the third dielectric layer 30. In practice, the second dielectric layer 20 is substantially parallel to the third dielectric layer 30, and the first dielectric layer 10 which is flexible covers the second dielectric layer 20, so that a sandwich structure including the first dielectric layer 10, the third dielectric layer 30 and the second dielectric layer 20 between the first dielectric layer 10 and the third dielectric layer 30 is formed. Since the second dielectric layer 20 has a specific thickness, the first dielectric layer 10 bends and hangs down, and an edge of the first dielectric layer 10 is attached to the third dielectric layer 30. This embodiment does not limit whether there are gaps between the first dielectric layer 10, second dielectric layer 20 and the third dielectric layer 30. For example, if there is a gap between the first dielectric layer 10 and the third dielectric layer 30 (e.g., around the second dielectric layer 20), the gap may be filled with gelatinous material. It is worth mentioning that FIG. 1 is seen from one side of the third dielectric layer 30, but person having ordinary skill in the art can understand that FIG. 1 does not show the actual appearance of the fingerprint recognition module 1, but is used to show the relative position of each component on the horizontal plane.

The first dielectric layer 10 is defined a first side 10*a* and a second side 10*b*, the adaptor board 120 may be disposed on the first side 10*a* of the first dielectric layer 10, first metal contact points 100*a* and second metal contact points 100*b* may be located on two sides of the adaptor board 120 respectively, and the first metal contact points 100*a* may electrically connected to the second metal contact points 100*b* one-to-one. Here, an inside layer of the adaptor board 120 may be provided with an one-to-one metal routing, so that the first metal contact points 100*a* and the second metal contact points 100*b* may be electrically connected to each other, and this embodiment does not it. In general, the processing unit 12 may be a commercially available microprocessor chip, such as a chip dedicated to recognize fingerprints. The appearance of the common microprocessor chip will be marked with the manufacturer and the specifications on one surface, and multiple bumps are exposed to the other opposite surface. Person having ordinary skill in the art can understand that the said bumps are located on a surface of the processing unit 12 near the first dielectric layer 10, and the said bumps are first conducting pads (not shown in the figures) of the processing unit 12 in this case. In one example, the first metal contact points 100*a* directly contacts the first conducting pads of the processing unit 12. Therefore, from a vertical perspective (from top to bottom in FIG. 2), an area surrounded by the first metal contact points 100*a* at the first side 10*a* may be substantially an area of the processing unit 12 at the first side 10*a*.

In addition, since FIG. 2 is a schematic cross-sectional view of the fingerprint recognition module 1 along the first direction (a line AA from top to bottom in FIG. 1), FIG. 2 shows two second metal contact points 100*b* on the right and the left. However, in fact, the second metal contact points 100*b* should surround a perimeter of first dielectric layer 10, and the first dielectric layer 10 should not cover the second metal contact points 100*b*, so that the second metal contact points 100*b* may be directly connected to the adaptor board 120. The expression of the perimeter may be, for example, as shown in FIG. 1. As mentioned above, the first metal contact points 100*a* is located on an area near a center of the adaptor board 120, and the second metal contact points 100*b* is located on the perimeter of the first dielectric layer 10. Under the condition that areas of the vertical projections of the first side 10*a* and the second side 10*b* of the first dielectric layer 10 are the same, an area (second area) surrounded by the second metal contact points 100*b* should be different from the area (first area) surrounded by the first metal contact points 100*a*, such as the second area may be larger than the first area. In terms of width (length of one side of an area), the first metal contact points 100*a* occupy a width D1, the second metal contact points 100*b* occupy a width D2, and the width D1 is smaller than the width D2. In addition, the adaptor board 120 may also be provided with other metal contacts, and the said metal contacts, for example, are used to connect circuit boards with other functions to transmit the signals sent from the processing unit 12. Alternatively, the said metal contacts may be connected to a power source for supplying power to the fingerprint recognition module 1, and this embodiment does not limit it.

Take FIG. 2 for example, the first sensing strings 14 is disposed on the second dielectric layer 20 and covered by the first dielectric layer 10, and the first sensing strings 14 are electrically connected to the processing unit 12. However, along the sectional direction of the line AA in FIG. 2 does not show conducting wires (first conducting wires) for transmitting the signals. The third dielectric layer 30 may be provided with the second sensing strings 16, second conducting wires 160 and second conducting pads 14*a*, and the second dielectric layer 20 is disposed on the third dielectric layer 30 and at least covers the second sensing strings 16. In practice, the third dielectric layer 30 may be defined a first side 30*a* and a second side 30*b*, wherein the second side 30*b* faces the first dielectric layer 10 and the second dielectric layer 20, and the first side 30*a* is opposite to the first side 30*b*. That is, the second sensing strings 16, the second conducting wires 160 and the second conducting pads 14*a* are disposed on the second side 30*b* of the third dielectric layer 30.

The second dielectric layer 20 covers the second sensing strings 16, so that the first sensing strings 14 and the second sensing strings 16 are not directly connected to avoid short circuits. In addition, the second dielectric layer 20 may cover a part of the second conducting wires 160, another part of the second conducting wires 160 may be covered by the first dielectric layer 10 (as shown in FIG. 2), and the ratio of the conducting wires 160 covered by the second dielectric layer 20 is not limited in this embodiment. Besides, each of the second sensing strings 16 may be electrically connected to at least one second conducting pads 14*a* though at least one second conducting wires 160. In one example, in order to make the sensing more sensitive, the front end and the rear end of one of the second sensing strings 16 may be connected to one of the second conducting wires 160 respectively, and two of the second conducting wires 160 may each be connected to one of the second conducting pads 14*a*. When the first dielectric layer 10 bends and hangs down, and the edge of the first dielectric layer 10 is attached to the second side 30*b* of the third dielectric layer 30, the second metal contact points 100*b* are electrically connected to the second conducting pads 14*a*. That is, the second conducting pads 14*a* should not be covered by the second dielectric layer 20, and the signals on the second conducting pads 14*a* may be transmitted to the processing unit 12 through the second metal contact points 100*b*. Moreover, the number of the second conducting pads 14*a* may be equal to the number of the second metal contact points 100*b*, and the second conducting pads 14*a* are connected to the second metal contact points 100*b* one-to-one.

In this embodiment, FIG. 2 shows a cross-section of the fingerprint recognition module 1 along an extension direction (first direction) of the line AA in FIG. 1, and FIG. 3 shows a cross-section of the fingerprint recognition module 1 along an extension direction (second direction) of a line BB. It may be seen that the fingerprint recognition module 1 should have different internal structures due to different cross-section directions. As may be seen from the example shown in FIG. 3, first conducting pillars 142 may also be disposed inside the fingerprint recognition module 1, the first conducting pillars 142 may be conductive vias disposed inside the second dielectric layer 20, or the first conducting pillars 142 may be disposed on a perimeter of the second dielectric layer 20, and this embodiment does not limit it. In practice, as long as the conductive material has the function of electrically connecting to routings of two sides of the second dielectric layer 20, it should belong to the scope of the first conducting pillars 142 exemplified in this embodiment.

As mentioned above, each of the first sensing strings 14 is electrically connected to one of first conducting wires 140. The first conducting wires 140 and the first sensing strings 14 are also on the second dielectric layer 20, and between the second dielectric layer 20 and first dielectric layer 10. Since the signals of the first sensing strings 14 are to be transmitted to the processing unit 12, the first conducting wires 140 need to be electrically connected to the second conducting pads 14*a*. However, since the second conducting pads 14*a* are disposed on the second side 30*b* of the third dielectric layer 30, there is a height difference (e.g., the thickness of the second dielectric layer 20) between the first conducting wires 140 and the second conducting pads 14*a* have. In order to enable the first conducting wires 140 to be stably electrically connected to the second conducting pads 14*a*, the first conducting wires 140 is connected to the first conducting pillars 142 first, the first conducting pillars 142 is connected to third conducting wires 162, and then the third conducting wires 162 are connected to the second conducting pads 14*a*. In other words, the second conducting wires 160 may directly extend to the second conducting pads 14*a*, but the first conducting wires 140 needs to be adapted through the first conducting pillars 142 and the third conducting wires 162 to be electrically connected to the second conducting pads 14a. It may be seen that the length of the first conducting wires 140 is shorter than the length of the second conducting wires 160. In one example, in order to make the sensing more sensitive, the front end and the rear end of one of the first sensing strings 14 may also be connected to one of the first conducting wires 140 respectively, two of the first conducting wires 140 may be connected to one of the first conducting pillars 142 respectively, the first conducting pillars 142 are connected to the third conducting wires 162, and then the third conducting wires 162 are connected to the second conducting pads 14a.

When viewed from the third dielectric layer 30, the first sensing strings 14 and the second sensing strings 16 are substantially perpendicular to each other. In practice, each of the first sensing strings 14 may be formed by connecting diamond-shaped conductive sheets together, and each of the second sensing strings 16 may also be formed by connecting diamond-shaped conductive sheets similar to the aforementioned the diamond-shaped conductive sheets. This embodiment does not limit that the shapes of the first sensing strings 14 and the second sensing strings 16. In addition, the first sensing strings 14 and the second sensing strings 16 exemplified in this embodiment may be capacitive sensing strings. For example, the first sensing strings 14 and the second sensing strings 16 may be pre-charged to a specific voltage, when ridges of the fingerprints touch the specific position, the ridges of the fingerprints will absorb the charge, so that the voltage drop may be measured at the corresponding first sensing strings 14 and second sensing strings 16. In general, the intersection point of the first sensing strings 14 and the second sensing strings 16 may be regarded as a fingerprint detection point, and the detection point density of the fingerprint recognition module 1 is above 500 dpi. Since this embodiment does not focus on the principle of the fingerprint recognition, the fingerprint recognition method of the fingerprint recognition module 1 is not described here. It is worth mentioning that the fingerprint recognition module 1 may have a fingerprint recognition region 300 defined on the first side 30a of the third dielectric layer 30, and substantially located on the center of the third side 30a. The fingerprint recognition region 300 may be an area where the first sensing strings 14 and the second sensing strings 16 intersect and overlap, i.e., an area with the fingerprint detection point In order to structurally protect the fingerprint recognition module 1, and avoid the problem of electrostatic interference, the first side 30a of the third dielectric layer 30 may also be provided with a metal shell (or a metal conducting film layer) 18. In one example, the metal shell 18 may be a hollow frame, and the hollow metal shell 18 may surround the fingerprint recognition region 300. In practice, the metal shell 18 may be electrically connected to the system ground. This embodiment does not limit the position of the system ground, and person having ordinary skill in the art can personally choose. Although the figures show that the metal shell 18 is disposed on the third dielectric layer 30, in practice, the metal shell 18 may also encase the fingerprint recognition module 1 (e.g., encase the first dielectric layer 10).

Structurally, the second conducting wires 160 and the third conducting wires 162 do not overlap or be connected together. In detail, although the second conducting wires 160 and the third conducting wires 162 are both disposed on the second side 30b of the third dielectric layer 30, disposition directions of the second conducting wires 160 and the third conducting wires 162 are different. For example, the second conducting wires 160 are substantially oriented an up-down direction (first direction) of FIG. 1, and the third conducting wires 162 are substantially oriented an left-right direction (second direction) of FIG. 1. In addition, in the example of FIG. 1, since the first sensing strings 14 extend in the left-right direction of FIG. 1, the cross-section in the left-right direction of FIG. 1 (FIG. 3) shows the adaptor structure of the first conducting wires 140, the third conducting wires 162 and the first conducting pillars 142. In contrast, the cross-section in the up-down direction of FIG. 1 (FIG. 2) does not need to be provided with the first conducting pillars 142, and the second conducting wires 160 may be seen. Of course, the second conducting pads 14a corresponding to the first sensing strings 14 and the second sensing strings 16 may be disposed on different sides of the fingerprint recognition module 1. For example, the second conducting pads 14a (the first conducting wires 140 and the third conducting wires 162) corresponding to the first sensing strings 14 are on the left-right sides shown in FIG. 1, and the second conducting pads 14a corresponding to the second sensing strings 16 (the second conducting wires 160) are on the up-down sides of the third dielectric layer 30 shown in FIG.1.

In one example, each of the first conducting wires 140 and the corresponding third conducting wires 162 extend in the same direction, and the difference between them is only that the third conducting wires 162 are on the third dielectric layer 30, and the first conducting wires 140 are on the second dielectric layer 20. In addition, FIG. 1 shows the first conducting wires 140 corresponding to the adjacent first sensing strings 14 may not have the same length, the third conducting wires 162 may not have the same length, and the adjacent first conducting pillars 142 may not be on the same vertical and horizontal axis. One reason is that, unlike there are the small number of the second conducting pads 14a shown in FIG. 1, there are actually many of the first sensing strings 14 and the second sensing strings 16, and there are also large number of the second conducting pads 14a. In order to maintain the structural strength, avoid interference between the signals, or allow each sensing strings to have the same signal transmission speed, it may be seen that, the first conducting pillars 142 closer to the corner is closer to the second conducting pads 14a, and the first conducting pillars 142 closer to the center is farther away from the second conducting pads 14a.

Figure 4:
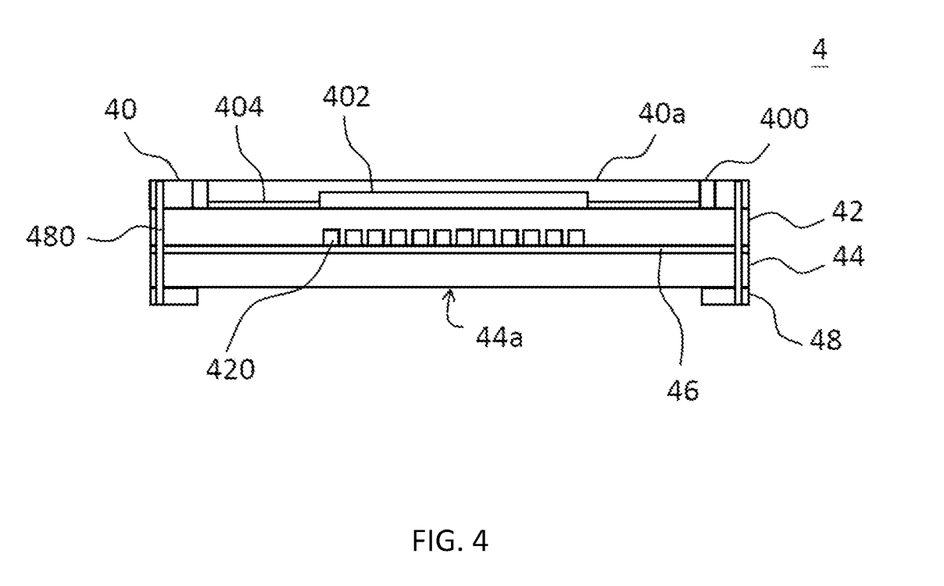
FIG. 4 is a schematic cross-sectional view of the fingerprint recognition module along the first direction in accordance with another embodiment of the present invention.
Figure 5:
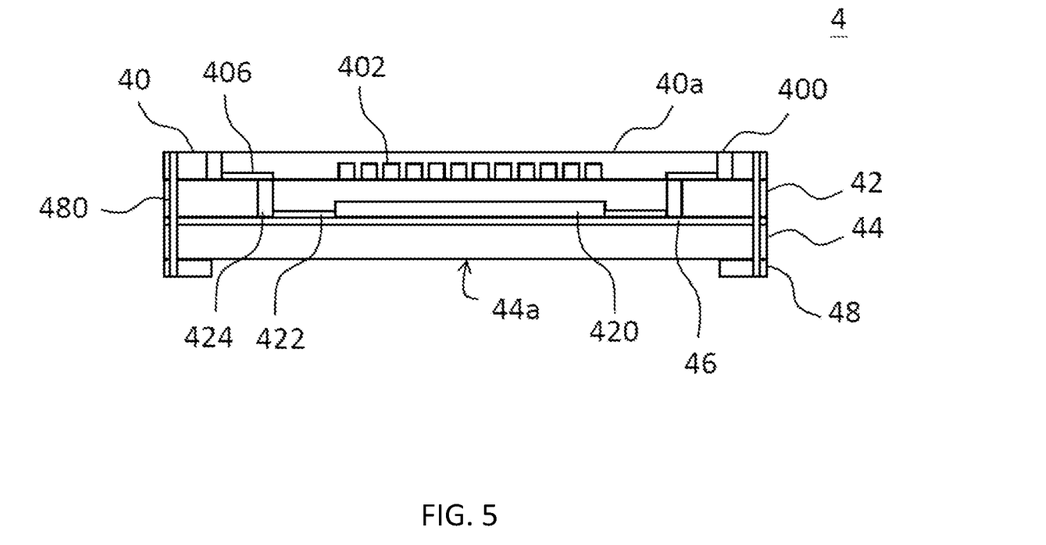
FIG. 5 is a schematic cross-sectional view of the fingerprint recognition module along the second direction in accordance with another embodiment of the present invention.

The present invention also provides another fingerprint recognition module, please refer FIG. 4 and FIG. 5. FIG. 4 is a schematic cross-sectional view of the fingerprint recognition module along the first direction in accordance with another embodiment of the present invention. FIG. 5 is a schematic cross-sectional view of the fingerprint recognition module along the second direction in accordance with another embodiment of the present invention. As shown in the figures, a fingerprint recognition module 4 comprises a first dielectric layer 40, a second dielectric layer 42 and a third dielectric layer 44. There are first conducting pillars 400 and first sensing strings 402 between the first dielectric layer 40 and the second dielectric layer 42, and there are second sensing strings 420 between the second dielectric layer 42 and the third dielectric layer 44. Similar to the previous embodiment, first conducting wires 404 and third conducting wires 406 may also be disposed in the first dielectric layer 40, and two ends of each of the first conducting wires 404 may be connected to one of the first conducting pillars 400 and one of the first sensing strings 402 respectively. In addition, second conducting wires 422 and second adaptor conducting pillars 424 may also be disposed in the second dielectric layer 42, and the second conducting wires 422 may be electrically connected to the corresponding third conducting wires 406 through the second adaptor conducting pillars 424. In this case, two ends of each of the third conducting wires 406 may be connected to one of the first conducting pillars 400 and one of the second adaptor conducting pillars 424 respectively. That is, the signals of the first sensing strings 402 and the second sensing strings 420 may also be guided to one of the first conducting pillars 400.

The first sensing strings 402 are disposed on the second dielectric layer 42, covered by the first dielectric layer 40 and electrically connected to the respective first conducting pillars 400. The second sensing strings 420, the second conducting wires 422 and the second adaptor conducting pillars 424 may be disposed on the third dielectric layer 44, and the second dielectric layer 42 may be disposed on the third dielectric layer 44. In one example, the first conducting pillars 400 are exposed to surface 40a of the first dielectric layer 40, so that first metal contact points are formed on the upper surface 40a of the first dielectric layer 40. This embodiment does not limit whether the first conducting pillars 400 protrude from the upper surface 40a, nor does this embodiment limit whether the first conducting pillars 400 penetrate the first dielectric layer 40, and person having ordinary skill in the art can freely design as needed. Moreover, an adhesive layer 46 may also be disposed between the third dielectric layer 44 and the second dielectric layer 42, and contact the second sensing strings 420, the second conducting wires 422 and the second adaptor conducting pillars 424 in the second dielectric layer 42, and this embodiment does not limit it. In practice, the adhesive layer 46 may be an adhesive between different materials, so that routings in the first dielectric layer 40 and the second dielectric layer 42 may be protected.

In terms of signal transmission, each of the first sensing strings 402 is electrically connected to one of the first conducting wires 404, which transmits the signals of the first sensing strings 402 to the first conducting pillars 400. Moreover, the second sensing strings 420 in the other direction is electrically connected to one of the second conducting wires 422, a length of the second conducting wires 422 is shorter than a length of the first conducting wires 404. The second conducting wires 422 is connected to the second adaptor conducting pillars 424 first, and then is connected to the upper layer through the second adaptor conducting pillars 424. For example, the second adaptor conducting pillars 424 is connected to the third conducting wires 406 in the first dielectric layer 40, and then is connected to the first conducting pillars 400 through the third conducting wires 406, so that the signals of the second sensing strings 420 may also transmitted to the first conducting pillars 400. As may be seen from the figures, a length of the third conducting wires 406 is shorter than the length of the first conducting wires 404, and the sum of the lengths of the second conducting wires 422 and the third conducting wires 406 may be close to the length of the first conducting wires 404.

Similar to the previous embodiment, when viewed form the third dielectric layer 44, the first sensing strings 402 and the second sensing strings 420 are substantially perpendicular to each other. In practice, each of the first sensing strings 402 may be formed by connecting diamond-shaped conductive sheets together, and each of the second sensing strings 420 may also be formed by connecting diamond-shaped conductive sheets similar to the aforementioned the diamond-shaped conductive sheets. This embodiment does not limit that the shapes of the first sensing strings 402 and the second sensing strings 420. In addition, the fingerprint recognition module 4 may also have a user-touchable area (e.g., a fingerprint recognition region) on a lower surface 44a of the third dielectric layer 44, and the user-touchable area is substantially located on the center of the third dielectric layer 44. In practice, an area where the first sensing strings 402 and the second sensing strings 420 intersect, overlap and have the fingerprint detection point may be the fingerprint recognition region.

In order to structurally protect the fingerprint recognition module 4, and avoid the problem of electrostatic interference, an edge of the lower surface 44a of the third dielectric layer 44 may also be provided with a metal shell or a metal conducting film layer 48. In one example, the metal shell or the metal conducting film layer 48 may be a hollow frame, and the hollow metal shell or the metal conducting film 48 may surround the fingerprint recognition. In practice, the metal shell or the metal conducting film layer 48 may have vias 480, and the vias 480 may penetrate the entire fingerprint recognition module 4 and be exposed to the upper surface 40a of the first dielectric layer 40, so that the vias 480 may form second metal contact points on the upper surface 40a. Of course, this embodiment does not limit whether the vias 480 protrude from the upper surface 40a. Different from the previous embodiment, the dimensions of the first dielectric layer 40, the second dielectric layer 42 and the third dielectric layer 44 are substantially the same to facilitate the packaging operation. Although the figures shows that the metal shell or the metal conducting film layer 48 is disposed on the third dielectric layer 44, in practice, the metal shell or the metal conducting film layer 48 may also encase a part of the fingerprint recognition module 4 (e.g., encase the first dielectric layer 40), and this embodiment does not limit.

Figure 6:
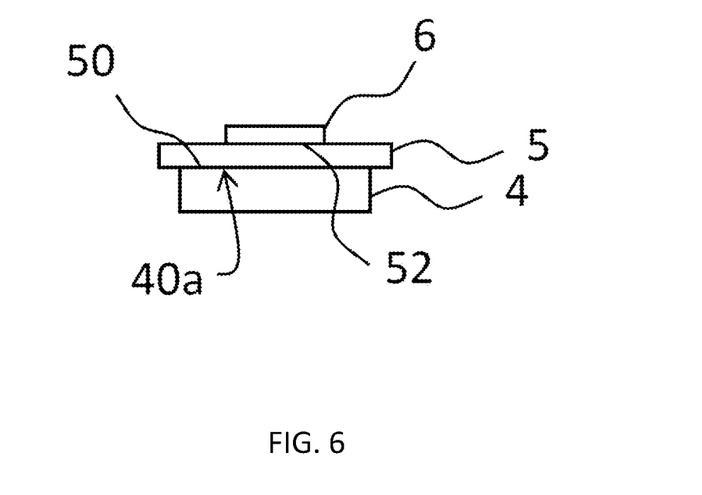
FIG. 6 is a schematic side view of the fingerprint recognition module in accordance with another embodiment of the present invention.
Figure 7:
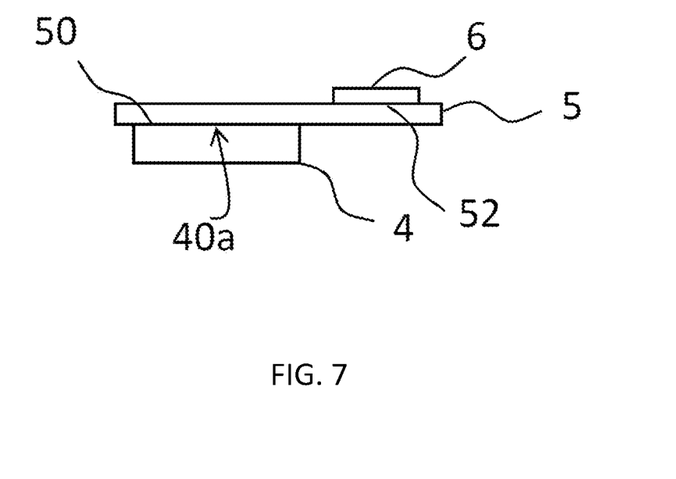
FIG. 7 is a schematic side view of the fingerprint recognition module in accordance with another embodiment of the present invention
Figure 8:
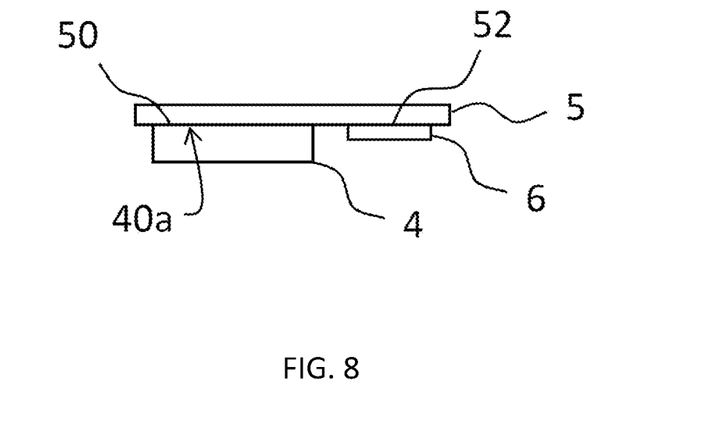
FIG. 8 is a schematic side view of the fingerprint recognition module in accordance with another embodiment of the present invention.

As mentioned above, the upper surface 40a of the first dielectric layer 40 may expose many metal contacts, which may not only transmit the signals of the first sensing strings 402 and the second sensing strings 420, but also used for grounding. The fingerprint recognition module 4 in this embodiment may also comprise an adaptor board for being connected to the contacts exposed to the upper surface 40a, and the fingerprint recognition module 4 is connected to a processing unit through the adaptor board. Please also refer FIG. 6, FIG. 7 and FIG. 8. FIG. 6 is a schematic side view of the fingerprint recognition module in accordance with another embodiment of the present invention. FIG. 7 is a schematic side view of the fingerprint recognition module in accordance with another embodiment of the present invention. FIG. 8 is a schematic side view of the fingerprint recognition module in accordance with another embodiment of the present invention. As shown in the figures, the fingerprint recognition module 4 may be connected to a processing unit 6 through an adaptor board 5, and the adaptor board 5 is provided with first adaptor contact points 50 and second adaptor contact points 52. The first adaptor contact points 50 and the second adaptor contact points 52 are oppositely connected to each other, and may be arranged in respective arrays respectively. For example, one of the first adaptor contact points 50 corresponds to one of the second adaptor contact points 52, and the signals received from the first adaptor contact points 50 may be transmitted to the second adaptor contact points 52 through the transmission of an internal routing in the adaptor board 5. In practice, the first adaptor contact points 50 are connected to the metal contacts (e.g., the first conducting pillars 400 and the vias 480) exposed to the upper surface 40a of the first dielectric layer 40 one-to-one.

The adaptor board 5 may have a large area of metal, so it may be regarded as the system ground and the static electricity in the fingerprint recognition module 4 may be guided to the adaptor board 5 through the vias 480. In addition, the second adaptor contact points 52 may be correspondingly connected to the conductive pads of the processing unit 6, so that the processing unit 6 may process the signals of the first sensing strings 402 and the second sensing strings 420. This embodiment here exemplifies that the processing unit 6 may be connected in various positions. For example, FIG. 6 and FIG. 7 exemplify that the first adaptor contact points 50 and the second adaptor contact points 52 may be on two opposite sides of the adaptor board 5, the difference between them is that the adaptor board 5 of FIG. 7 is bigger than the adaptor board 5 of FIG. 6, so that the processing unit 6 may be farther away from fingerprint recognition module 4. In practice, the fingerprint recognition module 4, the adaptor board 5 and the processing unit 6 may be packaged in the same shell. Moreover, since the processing unit 6 and the fingerprint recognition module 4 are just on the back of the adaptor board 5 in FIG. 6, the example of FIG. 6 may be adapted to a smaller shell. In the example of FIG. 6, a projected area surrounded by the first adaptor contact points 50 at least overlaps a part of a projected area surrounded by the second adaptor contact points 52. Since the projected area surrounded by the second adaptor contact points 52 is substantially positively related to the dimension of the processing unit 6, and the dimension of the processing unit 6 may be smaller than the dimension of the fingerprint recognition module 4, the projected area surrounded by the second adaptor contact points 52 is smaller than the projected area surrounded by the first adaptor contact points 50.

On the other hand, the adaptor board 5 may be a flexible substrate, so the processing unit 6 in FIG. 7 and FIG. 8 may also be redirected to other positions and away from the fingerprint recognition module 4 by the adaptor board 5. As may be seen from the figures, the difference between FIG. 7 and FIG. 8 may only be that the first adaptor contact points 50 and the second adaptor contact points 52 are on the same side or opposite sides of the adaptor board 5, but both FIG. 7 and FIG. 8 may be adapted to different shapes of shell.

In summary, the fingerprint recognition module provided by the present invention may directly assemble the sensing film layer and the processing unit, so that the processing unit and the fingerprint recognition region may be located on two sides of the fingerprint recognition module respectively. Thus, the fingerprint recognition module of the present invention may be further reduced in dimension, and have the higher assembly yield. In addition, another fingerprint recognition module provided by the present invention may have the extended adaptor board, and the processing unit may be assembled on the same side or two sides of the adaptor board, which may also reduce the dimension of the fingerprint recognition module and may have higher assembly yield.

What is claimed is:

1. A fingerprint recognition module, comprising:
   a first dielectric layer, defined a first side and a second side, wherein an adaptor board is disposed on the first side, and two sides of the adaptor board are provided with first metal contact points and second metal contact points electrically connected to the first metal contact points;
   a processing unit, disposed on the first side, wherein the processing unit has first conducting pads, and each of the first conducting pads is for electrically connecting to one of the first metal contact points;
   a plurality of first sensing strings, disposed between the first dielectric layer and a second dielectric layer, electrically connected to conducting wires; and
   a plurality of second sensing strings, disposed between the second dielectric layer and a third dielectric layer, electrically connected to second conducting wires;
   wherein each of the first conducting wires are electrically connected to one of the third conducting wires through a first conducting pillar, and the second conducting wires and the third conducting wires are electrically connected to the second metal contact points;
   wherein the first metal contact points surround a first area, the second metal contact points surround a second area, and the first area is smaller than the second area.

2. The fingerprint recognition module according to claim 1, wherein the first strings are arranged along a first direction, the second strings are arranged along a second direction, and the first direction is perpendicular to the second direction.

3. The fingerprint recognition module according to claim 1, wherein the third dielectric layer has a first side and a second side, the second conducting wires and the third conducting wires and the second conducting pads are disposed on the second side of the third dielectric layer, each of the second conducting wires is electrically connected to one of the second conducting pads, and each of the third conducting wires is electrically connected to one of the second conducting pads.

4. The fingerprint recognition module according to claim 3, wherein each of the second metal contact points contacts one of the second conducting pads.

5. The fingerprint recognition module according to claim 4, wherein the second metal contact points are disposed on an edge of the second side.

6. The fingerprint recognition module according to claim 3, wherein the first side of the third dielectric layer is defined a fingerprint recognition region, the fingerprint recognition region overlaps a region surrounded by the first sensing strings and the second sensing strings, and an area of the fingerprint recognition region is smaller than the second area.

7. The fingerprint recognition module according to claim 3, further comprising a metal shell or a metal conducting film layer, wherein the metal shell or the metal conducting film layer is disposed on the first side of the third dielectric layer, and the metal shell or the metal conducting film layer surrounds the fingerprint recognition region.

8. The fingerprint recognition module according to claim 7, further comprising an antistatic through hole communicating the metal shell or the metal conducting film layer, the first dielectric layer, the second dielectric layer and the third dielectric layer, wherein one end of the antistatic through hole exposes to the metal shell or the metal conducting film layer, and another end of the antistatic through hole exposes to the third dielectric layer.

9. The fingerprint recognition module according to claim 8, further comprising a through hole protecting component, wherein the through hole protecting component covers the antistatic through hole exposed to the metal shell or the metal conducting film layer.

10. The fingerprint recognition module according to claim 1, wherein the second conducting wires and the third conducting wires are coplanar.

11. The fingerprint recognition module according to claim 1, further comprising a first glue layer, wherein the first glue layer is disposed between the first dielectric layer and the second dielectric layer, and covers the first sensing strings.

12. A fingerprint recognition module, comprising:
- a first dielectric layer, provided with first conducting pillars;
- a plurality of first sensing strings, disposed between the first dielectric layer and a second dielectric layer, electrically connected to first conducting wires, wherein each of the first conducting wires is electrically connected to one of the first conducting pillars;
- a plurality of second sensing strings, disposed between the second dielectric layer and a third dielectric layer, and electrically connected to second conducting wires; and
- an adaptor board, connected to the first dielectric layer, and provided with first adaptor contact points and second adaptor contact points, wherein the first adaptor contact points are electrically connected to the second adaptor contact points, and each of the first adaptor contact points is for electrically connecting to one of the first conducting pillars;

wherein each of the second conducting wires is electrically connected to one of third conducting wires through a second conducting pillar, and each of the third conducting wires is electrically connected to one of the first conducting pillars.

13. The fingerprint recognition module according to claim 12, wherein a projected area surrounded by the first adaptor contact points overlaps a projected area surrounded by the second adaptor contact points.

14. The fingerprint recognition module according to claim 12, further comprising a processing unit, wherein the processing unit has first conducting pads, and each of the first conducting pads is for electrically connecting to one of the first adaptor contact points.

15. The fingerprint recognition module according to claim 12, wherein the first conducting pillars expose the first dielectric layer next to the adaptor board to form first metal contact points on a surface of the first dielectric layer.

* * * * *